United States Patent
Haupt

(10) Patent No.: US 12,221,816 B2
(45) Date of Patent: Feb. 11, 2025

(54) VEHICLE LATCH TESTING ASSEMBLY

(71) Applicant: NISSAN NORTH AMERICA, INC., Franklin, TN (US)

(72) Inventor: James Haupt, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 291 days.

(21) Appl. No.: 17/850,759

(22) Filed: Jun. 27, 2022

(65) Prior Publication Data
US 2023/0417086 A1 Dec. 28, 2023

(51) Int. Cl.
*E05B 81/66* (2014.01)
*G01M 99/00* (2011.01)

(52) U.S. Cl.
CPC .......... *E05B 81/66* (2013.01); *G01M 99/007* (2013.01); *E05Y 2900/531* (2013.01)

(58) Field of Classification Search
CPC . E05B 81/66; G01M 99/007; E05Y 2900/531
See application file for complete search history.

(56) References Cited

U.S. PATENT DOCUMENTS

| | | | | |
|---|---|---|---|---|
| 6,081,654 | A * | 6/2000 | Morman | G06F 30/23 703/7 |
| 6,189,394 | B1 * | 2/2001 | Sullivan | E05B 81/20 70/95 |
| 6,247,373 | B1 * | 6/2001 | Bree | G01L 1/26 73/865.9 |
| 2016/0266013 | A1 * | 9/2016 | Torres Salvador | G01M 99/008 |
| 2019/0128025 | A1 * | 5/2019 | Ishikawa | E05B 77/04 |
| 2019/0211586 | A1 * | 7/2019 | Gray | B60J 5/06 |
| 2019/0284845 | A1 * | 9/2019 | Fraley | E05B 83/40 |

FOREIGN PATENT DOCUMENTS

| | | | |
|---|---|---|---|
| CN | 102147328 A | | 8/2011 |
| CN | 202939014 U | * | 5/2013 |
| KR | 20000060770 A | * | 10/2000 |
| KR | 20010002801 A | * | 1/2001 |
| KR | 101580744 B1 | | 12/2015 |

* cited by examiner

*Primary Examiner* — Mark A Williams
(74) *Attorney, Agent, or Firm* — Global IP Counselors, LLP

(57) ABSTRACT

A vehicle latch testing assembly includes a base, a latch assembly fixed to the base, a striker assembly configured to engage the latch assembly, and a strain gauge connected to the striker assembly. An operating member is connected to the strain gauge and pivotally connected to the base. The operating member is configured to move between a first position and a second position to apply a first force to the latch assembly.

20 Claims, 13 Drawing Sheets

VEHICLE LATCH TESTING ASSEMBLY

BACKGROUND

Technical Field

The present disclosure generally relates to a vehicle latch testing assembly. More specifically, the present disclosure relates to a vehicle latch testing assembly in which an operating member controls a force applied by a striker assembly on a latch assembly.

Background Information

Latch assemblies for vehicle doors are tested prior to installation in a vehicle. Conventional latch testing assemblies require the latch and striker assemblies to be mounted in various positions to apply forces in different directions.

SUMMARY

A need exists for a vehicle latch testing assembly that quickly and easily tests latch assemblies for vehicle doors.

In view of the state of the known technology, one aspect of the present disclosure is to provide a vehicle latch testing assembly. A latch assembly is fixed to a base. A striker assembly is configured to engage the latch assembly. A strain gauge is connected to the striker assembly. An operating member is connected to the strain gauge and pivotally connected to the base. The operating member is configured to move between a first position and a second position to apply a first force to the latch assembly.

Another aspect of the present disclosure is to provide a method of testing a vehicle latch assembly. A latch assembly is mounted to a base. A strain gauge is connected to a striker assembly. An operating member is connected to the strain gauge and to a first pivot point of the base. The striker assembly is engaged with the latch assembly. The operating member is pivoted to apply a first force in a first direction to the latch assembly.

Also other objects, features, aspects and advantages of the disclosed vehicle latch testing assembly will become apparent to those skilled in the art from the following detailed description, which, taken in conjunction with the annexed drawings, discloses exemplary embodiments of the vehicle latch testing assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
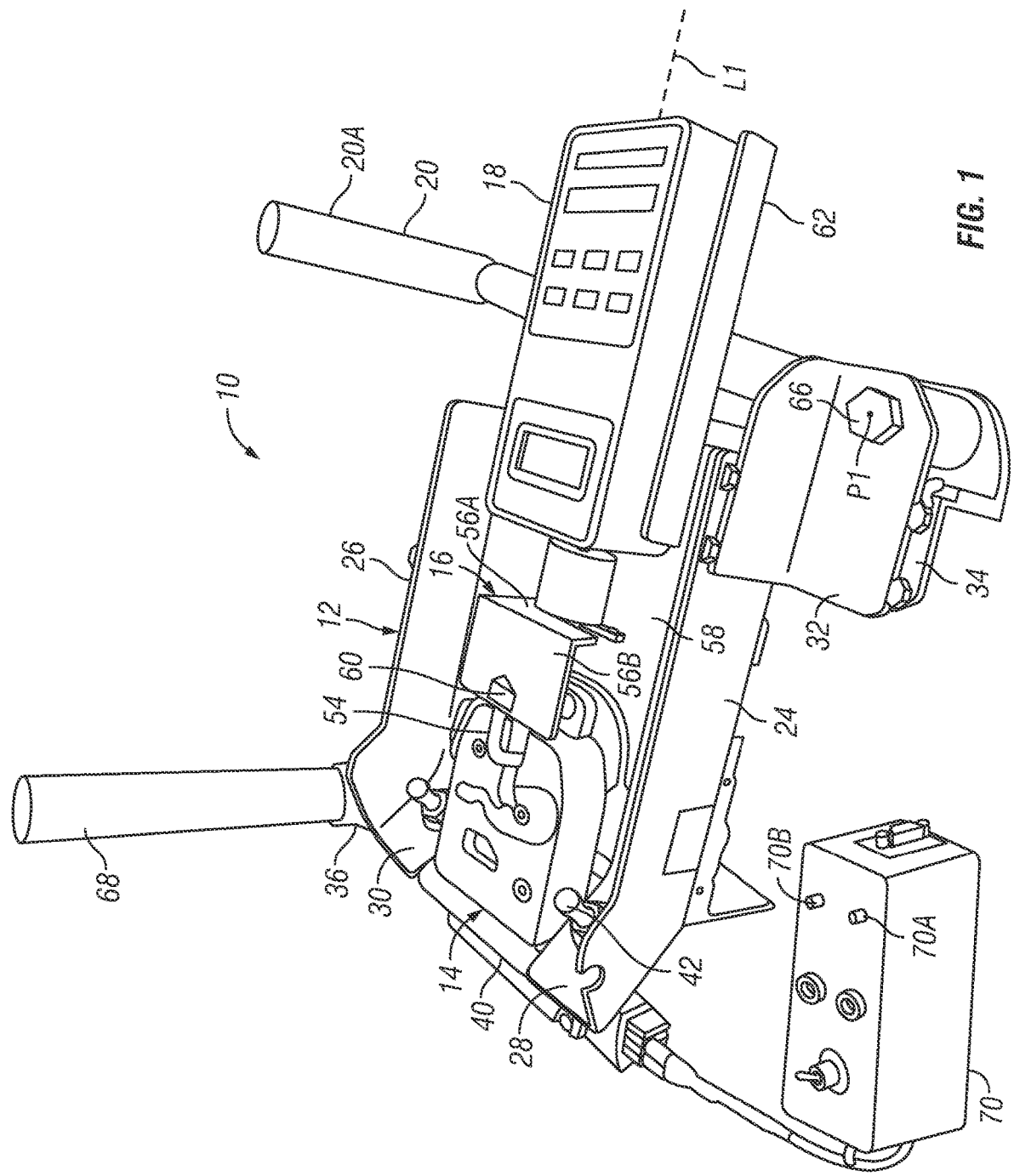
FIG. 1 is a perspective view of a vehicle latch testing assembly in accordance with a first exemplary embodiment in which an operating member is in a first position.
Figure 2:
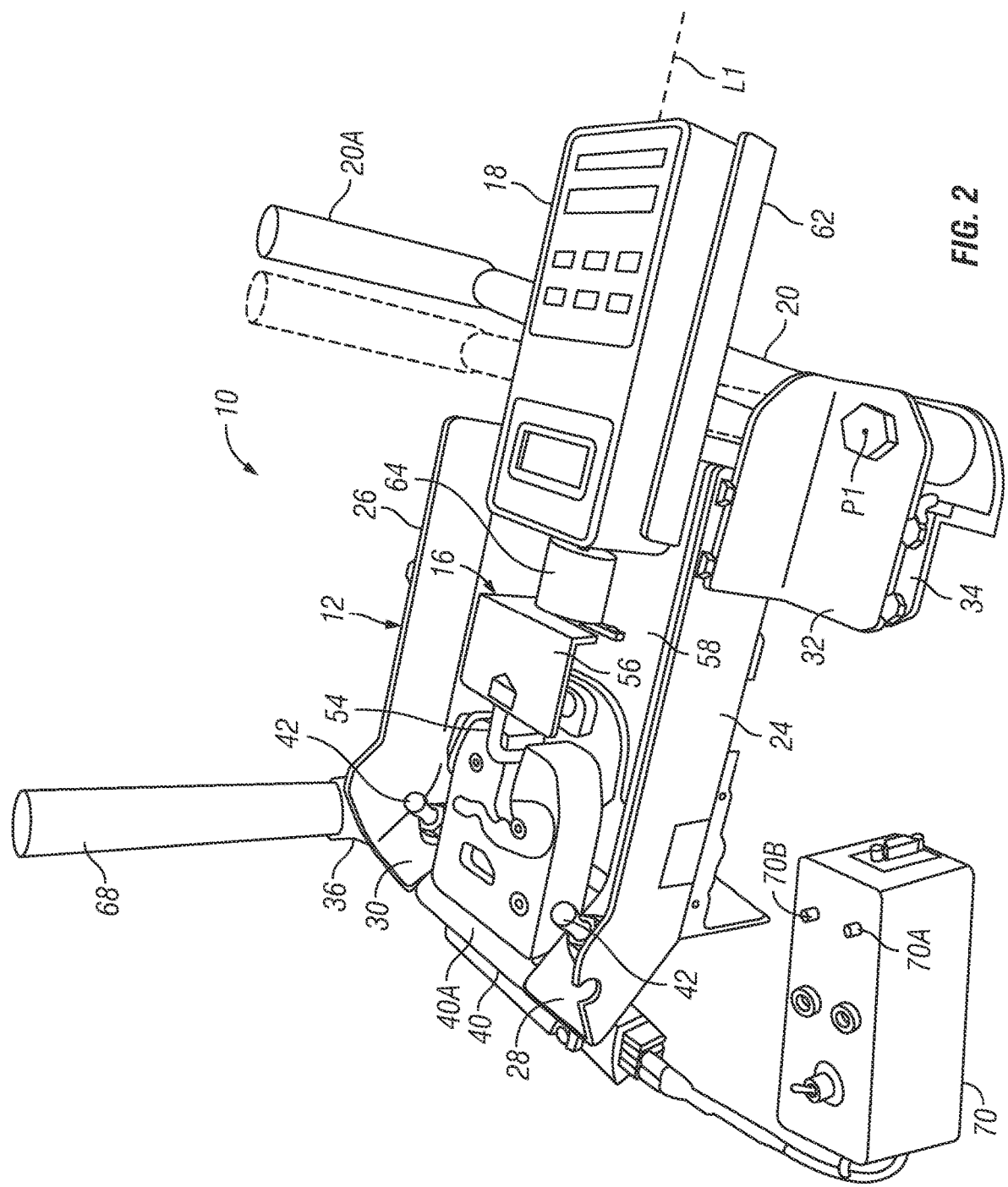
FIG. 2 is a perspective view of the vehicle latch testing assembly of FIG. 1 in which the operating member is in a second position.
Figure 3:
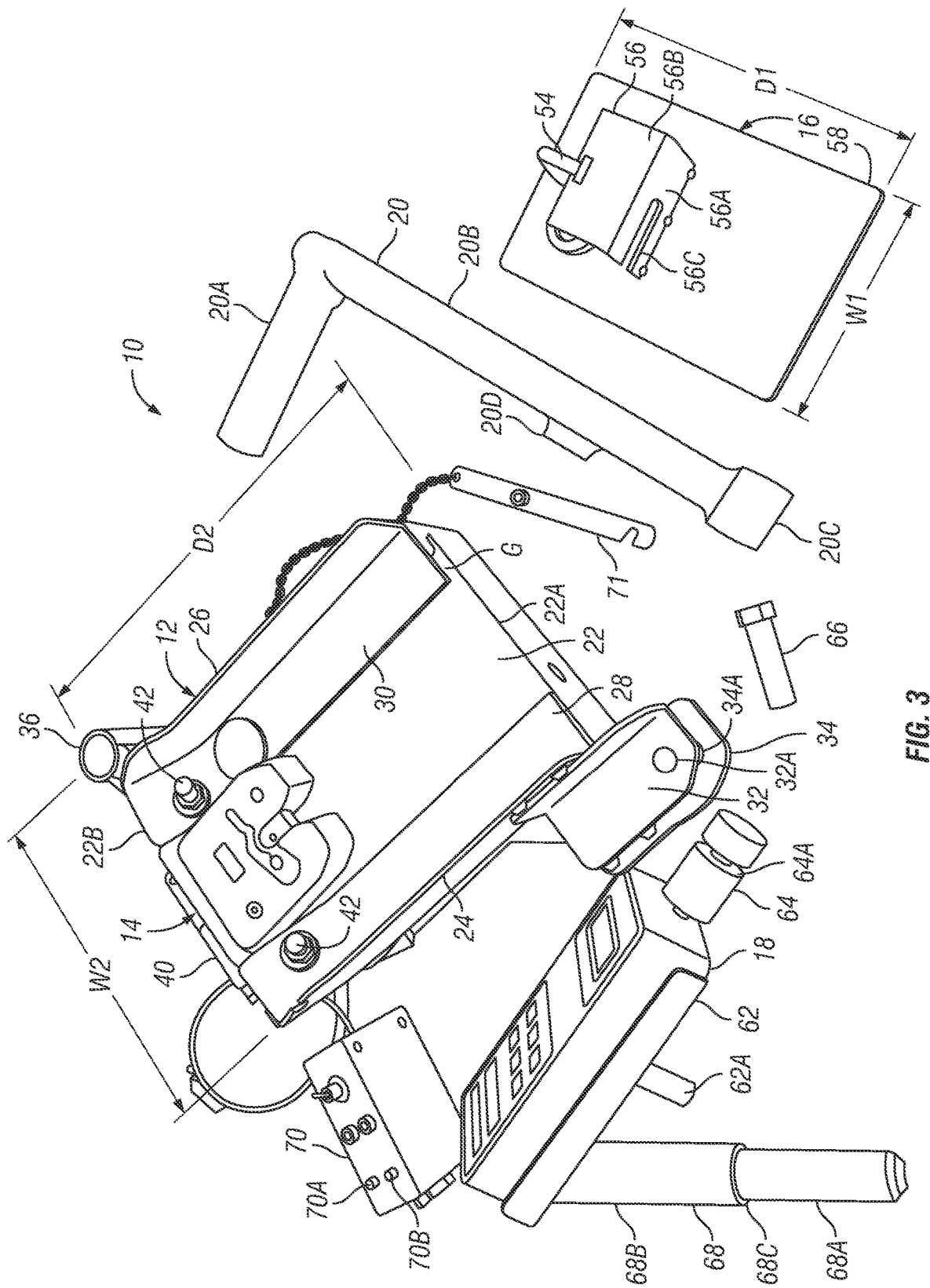
FIG. 3 is an exploded perspective view of the vehicle latch testing assembly of FIG. 1.

Referring initially to FIGS. 1-3, a vehicle latch testing assembly 10 is illustrated in accordance with a first exemplary embodiment. The vehicle latch testing assembly 10 includes a base 12, a latch assembly 14 fixed to the base 12, a striker assembly 16 configured to engage the latch assembly 14, and a strain gauge 18 connected to the striker assembly 16. An operating member 20 is connected to the strain gauge 18 and is pivotally connected to the base 12. The operating member 20 is configured to move between a first position, as shown in FIG. 1, and a second position, as shown in FIG. 2, to apply a first force to the latch assembly 14.

The base 12 includes a substantially planar surface 22, as shown in FIGS. 1-3. First and second walls 24 and 26 extend upwardly from opposite edges of the planar surface 22. First and second tabs 28 and 30 extend inwardly toward one another from the first and second walls 24 and 26. The first and second tabs 28 and 30 are spaced from the substantially planar surface 22 to define a gap G between each of the first and second tabs 28 and 30 and the substantially planar surface 22.

A first receiving tab 32 extends outwardly from the first wall 24, as shown in FIGS. 1-3. A first fastener hole 32A is disposed in the receiving tab 32. The first fastener hole 32A is disposed forward of a forward end 22A of the substantially planar surface 22. A second receiving tab 34 is spaced from and disposed parallel to the first receiving tab 32. A second fastener hole 34A is disposed in the second receiving tab 34 and aligned with the first fastener hole 32A.

A receiving tube 36 is connected to the second wall 26, as shown in FIGS. 1-3. The receiving tube 36 is disposed proximal a rear end 22B of the substantially planar surface 22.

Figure 11:
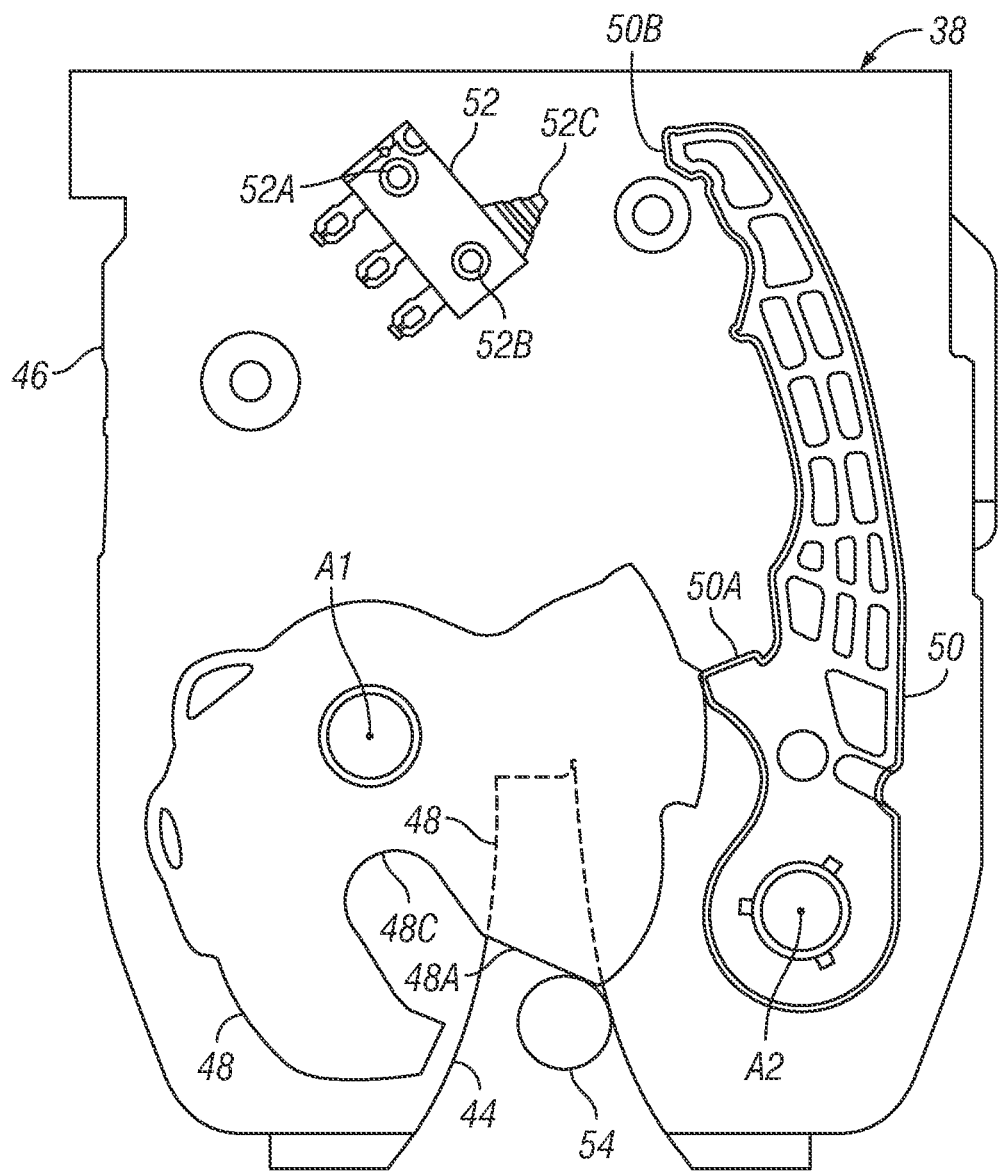
FIG. 11 is a top plan view of a latch assembly of the vehicle latch testing assembly of FIG. 1 in an unlatched position in which the striker assembly is not engaged with the latch assembly.
Figure 12:
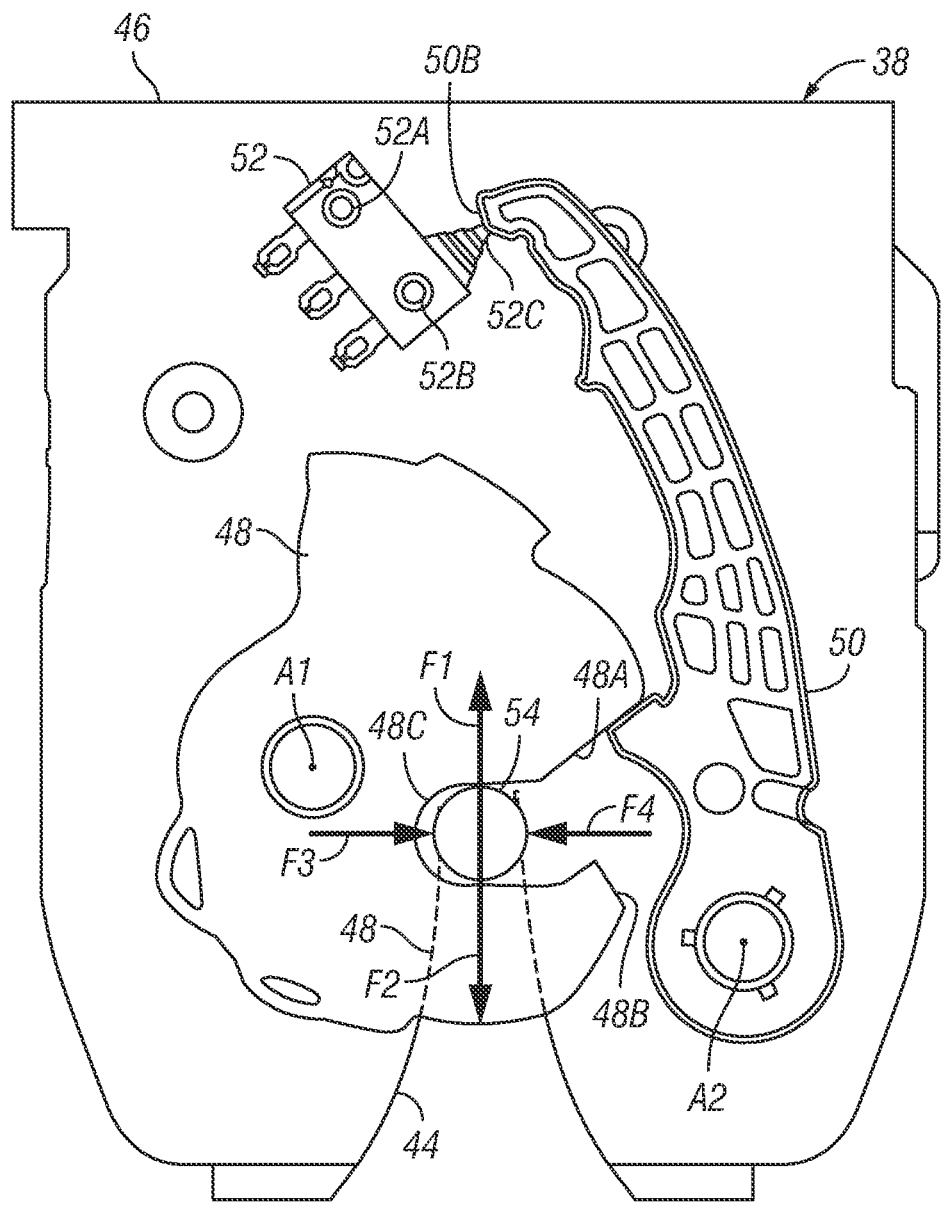
FIG. 12 is a top plan view of the latch assembly of FIG. 11 in a latched position in which the striker assembly is engaged with the latch assembly.
Figure 13:
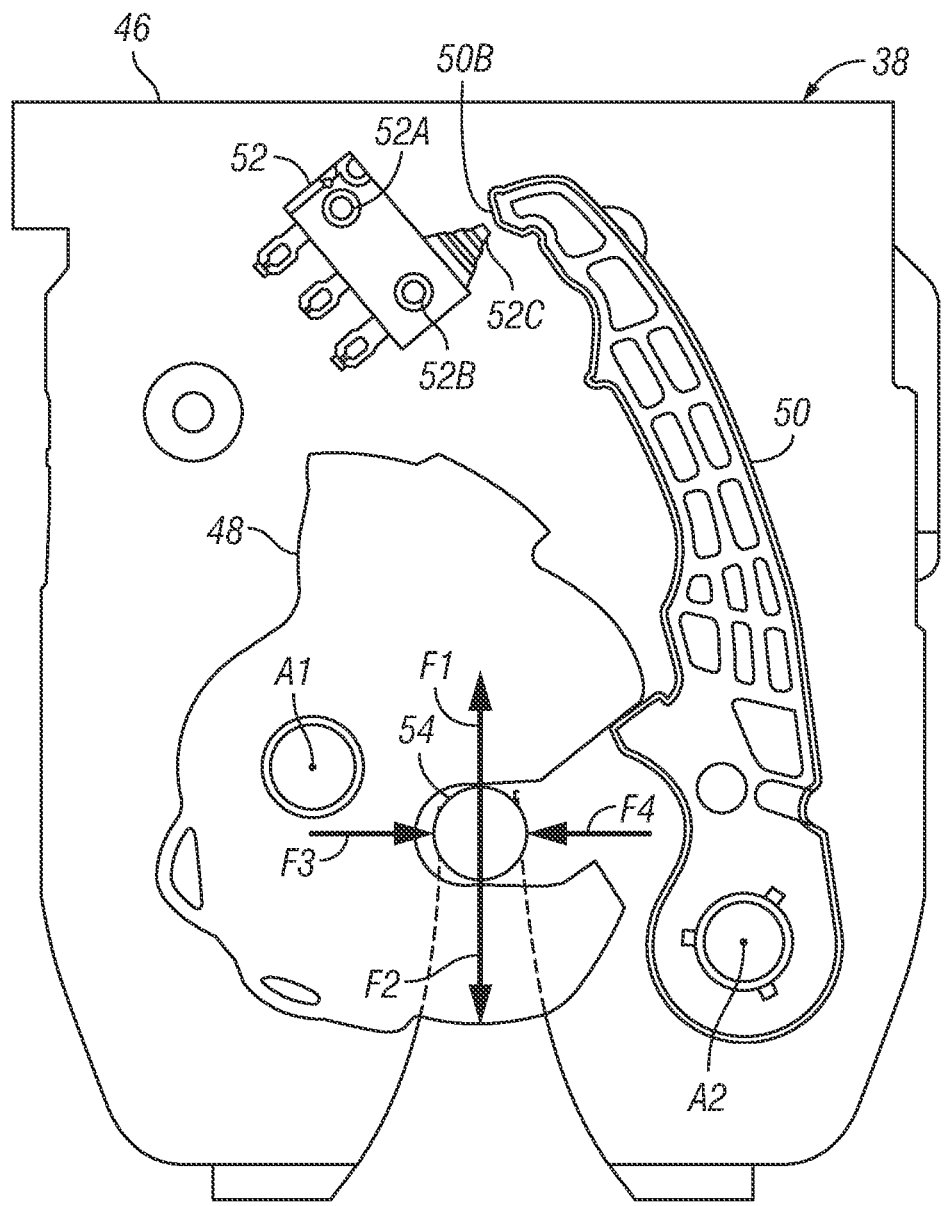
FIG. 13 is a top plan view of the latch assembly of FIG. 12 in which the latch arm is moved to an unlatched position while the striker assembly is engaged with the latch assembly.

The latch assembly 14 is fixed to the base 12, as shown m FIGS. 1-3. The latch assembly 14 includes a conventional latch 38, as shown in FIGS. 11-13. The latch assembly 14 includes a mounting portion 40 configured to mount to the base 12. The mounting portion 40 includes a mounting tab 40A having a plurality of fastener holes 140B (FIG. 8) configured to receive fasteners 42, as shown in FIGS. 1-3. The mounting portion 40 is connected to the latch 38 in any suitable manner.

The latch 38 of the latch assembly 14 includes an opening 44 disposed in a latch plate 46 configured to receive the striker assembly 16, as shown in FIGS. 11-13. A ratchet 48 is pivotally connected to the latch plate 46. The ratchet 48 rotates about a first rotation axis A1. A locking pawl 50 is pivotally connected to the latch plate 46 on an opposite side of the opening 44 from the ratchet 48. The locking pawl 50 rotates about a second rotation axis A2.

A switch 52 is connected to the latch plate 46, as shown in FIGS. 11-13. The locking pawl 50 is configured to contact the switch 52 when the latch assembly 14 receives the striker assembly 16 to indicate a latched position, as shown in FIG. 12. The switch 52 indicates an unlatched position when the latch assembly 14 does not receive the striker assembly 16, as shown in FIG. 11. The switch 52 includes a first indicator 52A to indicate the unlatched position, and a second indictor 52B to indicate the latched position. The first indicator 52A is electrically connected to the switch 52 of the latch assembly 14 and is configured to indicate an unlatched position between the striker assembly 16 and the latch assembly 14, as shown in FIG. 11. The second indictor light 52B is electrically connected to the switch 52 of the latch assembly 14 and is configured to indicate a latched position between the striker assembly 16 and the latch assembly, as shown in FIG. 12. The first and second indicators 52A and 52B can be any suitable indicators, such as light-emitting diodes (LEDs).

The vehicle door is in an unlatched position when a striker 54 of the striker assembly 16 is not received by the latch 38 of the latch assembly 14, as shown in FIG. 11. When the latch 38 receives the striker 54, as shown in FIG. 12, the locking pawl 50 contacts the switch 52 to trigger the second indicator 52B to indicate the latch assembly 14 is in the latched position.

The striker 54 is received in the latch opening 44 and contacts a first arm 48A of the ratchet 48, as shown in FIG. 11. Further movement of the striker 54 into the opening 44 causes the ratchet 48 to rotate in a counter-clockwise direction about the first rotation axis A1. A cam 50A of the locking pawl 50 contacts the ratchet 48 when the latch assembly 14 is in the unlatched position, as shown in FIG. 11. The striker 54 continues to rotate the ratchet 48 about the first rotational axis A1 until the striker 54 is received in a recess 48C between the first arm 48A and a second arm 48B of the ratchet 48, as shown in FIG. 12.

The cam 50A is received in the recess 48C between the first and second arms 48A and 48B of the ratchet 48, as shown in FIG. 12. The locking pawl 50 is biased toward the latched position, as shown in FIG. 12. The ratchet 48 maintains the locking pawl 50 in the unlatched position, as shown in FIG. 11. Rotation of the ratchet 48 to the latched position shown in FIG. 12 causes the locking pawl 50 to rotate in the counter-clockwise direction about the second rotation axis A2. The rotation of the locking pawl 50 causes a contact end 50B of the locking pawl 50 to contact a contact 52C of the switch 52 to illuminate the second indicator 52B.

When the contact 52C is not engaged by the locking pawl 50, as shown in FIG. 11, the first indicator 52A is illuminated.

The striker assembly 16 includes a support member 56 connected to a base, or plate, 58, as shown in FIGS. 1-3. The support 56 includes a first support wall 56A extending substantially perpendicularly from the base 58. A second support wall 56B extends substantially perpendicularly from the first support wall 56A. The second support wall 56B is preferably substantially parallel to the base 58. The first support wall 56A is connected to the base 58 in any suitable manner, such as by welding. The striker 54 is connected to the base 58 and to the second support wall 56B. The striker 54 is a U-shaped member. The legs of the striker 54 are connected to the base 58 in any suitable manner, such as by welding. A portion of the striker 54 is connected to the second support wall 56B in any suitable manner, such as by welding. A recess 56C is disposed in the first support wall 56A, as shown in FIG. 3.

The strain gauge 18 is connected to a base 62, as shown in FIGS. 1-3. A projection 62A extends outwardly from a lower surface of the base 62 and is configured to be received by the operating member 20. A connecting member 64 is connected to the strain gauge 18 and is configured to be received by the recess 56C in the support member 56 of the striker assembly 16. A notch 64A in the connecting member 64 is received by the recess 56C. The connecting member 64 is disposed on opposite sides of the first support wall 56A to substantially prevent movement of the strain gauge relative to the support member 56 of the striker assembly 16.

The operating member 20 includes a handle 20A connected to a main portion 20B, as shown in FIGS. 1-3. A socket 20C is disposed at a first end of the main portion 20B. The socket 20C includes an opening configured to receive a fastener 66. The opening in the socket 20C preferably extends entirely through the socket 20C. The socket 20C is disposed at a first end of the operating member 20. The handle 20A is disposed at a second end of the operating member 20. In other words, the handle 20A and the socket 20C are disposed at opposite ends of the operating member 20. A boss 20D extends outwardly from the main portion 20B of the operating member 20. The boss 20D includes an opening to receive the projection 62A of the strain gauge base 62.

A handle 68 is connected to the base 12, as shown in FIGS. 1-3. The handle 68 is configured to be received by the receiving tube 36, as shown in FIGS. 1-3. The handle 68 includes a first portion 68A configured to be received by the receiving tube 36. A second portion 68B of the handle 68 is disposed externally of the receiving tube 36. The second portion 68B has a larger diameter than the first portion 68A such that a shoulder 68C is formed therebetween. The shoulder 68C engages the receiving tube 36 to limit an insertion depth of the handle 68. The handle 68 is non-movably connected to the base 12 such that the handle 68 does not move relative to the base 12 during movement of the operating member 20.

A latch position indicator 70 is electrically connected to the latch assembly 14, as shown in FIGS. 1 and 2. The latch position indicator 70 includes first and second indicators 70A and 70B that indicate a position of the latch assembly 14. The latch position indicator 70 is electrically connected to the switch 52 of the latch assembly 14. The first indicator 70A of the latch position indicator 70 is illuminated when the first indicator 52A of the switch 52 is illuminated. The first indicator 70A of the latch position indicator 70 illuminates to indicate an unlatched position (FIG. 11) of the latch assembly 14. The second indicator 70B of the latch position indicator 70 is illuminated when the second indicator 52B of the switch 52 is illuminated. The second indicator 70B of the latch position indicator 70 illuminates to indicate a latched position (FIG. 12) of the latch assembly 14.

The vehicle latch testing assembly 10 is shown assembled in FIGS. 1 and 2 and unassembled in FIG. 3. The latch assembly 14 is mounted to the base 12, and is secured thereto by fasteners 42. A mounting portion 40 of the latch assembly 14 receives the rear end 22B of the substantially planar surface 22, such that a portion of the mounting portion is disposed on a lower side of the substantially planar surface 22. The fasteners 42 rigidly fix the latch assembly 14 to the base 12. The handle 68 is inserted in the receiving tube 36. The latch position indicator 70 is electrically connected to the switch 52 (FIGS. 11-13) of the latch assembly 14. The latch assembly 14 is currently in an unlatched position (FIG. 11) such that the first indicator 70A of the latch position indicator is illuminated to indicate an unlatched position of the latch assembly 14.

The operating member 20 is connected to the base 12, as shown in FIGS. 1 and 2. The socket 20C of the operating member 20 is disposed between the first and second receiving tabs 32 and 34 such that the socket 20C is aligned with the first and second fastener holes 32A and 34A. The fastener 66 is inserted through the first fastener hole 32A, the socket 20C and the second fastener hole 34A to pivotally connect the operating member 20 to the base 12. The fastener 66 received by the first fastener hole 32A in the first receiving tab 32, the socket 20C of the operating member 20, and the second fastener hole 34A in the second receiving tab 34 defines a first pivot point P1 of the operating member 20. The socket 20C disposed at the first end of the operating member 20 is pivotally connected to the base 12. The handle 20A disposed at the second end of the operating member 20 facilitates operation of the operating member 20.

The strain gauge 18 is connected to the striker assembly 16 and to the operating member 20. The projection 62A of the strain gauge base 62 is received by the boss 20D of the operating member 20, as shown in FIGS. 1 and 2. The connecting member 64 connected to the strain gauge 18 is connected to the support member 56 fixed to the base 58 of the striker assembly 16. The connecting member 64 is slid into the recess 56C disposed in the first support wall 56A of the support member 56. The notch 64A in the connecting member 64 receives the first support wall 56A, thereby substantially prevent longitudinal movement of the strain gauge relative to the striker assembly 16.

The base 58 of the striker assembly 16 is inserted in the gap G formed between the first and second 28 and 30 and the substantially planar surface 22 of the base 12, as shown in FIGS. 1 and 2. The base 58 of the striker assembly 16 is configured to be movably disposed on the surface 22 of the base 12. A first length D1 of the base, or plate, 58 of the striker assembly 16 is less than a second length D2 of the base 12, as shown in FIG. 3, to accommodate movement of the operating member 20. A first width si of the base, or plate, 58 of the striker assembly 16 is less than a second width of the surface 22 of the base 12 to accommodate movement of the operating member 20. The operating member 20 is pivoted about the first pivot point P1 to move the striker assembly 16 longitudinally toward or away from the latch assembly 14. The projection 62A of the strain gauge base 62 allows the striker assembly 14 to move substantially longitudinally without lateral movement during pivotal movement of the operating member 20.

The operating member 20 is pivoted in a counter-clockwise direction to engage the striker 54 of the striker assembly 16 with the latch assembly 14, as shown in FIGS. 11 and 12. The handle 68 can be held to facilitate operation of the operating member 20. The counter-clockwise pivotal movement of the operating member 20 moves the striker 54 into engagement with the ratchet 48, such that the latch assembly 14 is in the latched position shown in FIG. 12. Once the latch assembly 14 is in the latched position shown in FIG. 12, the operating member 20 is pivoted in the counter-clockwise direction to impart force F1 on the ratchet 48 of the latch assembly 14, as shown in FIG. 12. The operating member 20 is pivoted in the clockwise direction to impart force F2 on the ratchet 48 of the latch assembly 14. The forces, or loads, F1 and F2 correspond to tension and compression forces applied to the latch assembly 14. The operating member 20 is pivotally connected to the strain gauge 18 such that the strain gauge 18 moves substantially longitudinally along a longitudinal axis L1 of the strain gauge 18 when the operating member 20 moves between the first and second positions to impart a force on the latch assembly 14. The projection 62A of the base 62 of the strain gauge 18 is received by the boss 20D of the operating handle 20 to allow for substantially longitudinal movement of the strain gauge 18 along the longitudinal axis L1 as the operating member 20 is pivoted about the first pivot point P1.

When a force, such as force F1 or F2, exerted on the ratchet 48 of the latch assembly 14 causes rotation of the locking pawl 50 about the second rotation axis A2 such that the contact end 50B of the locking pawl 50 no longer contacts the contact 52C of the switch 52, the force determined by the strain gauge 18 is measured and recorded. The second indicator 52B of the switch 52 is illuminated, and a signal is transmitted to the latch position indicator 70 to illuminate the second indicator 70B to indicate an unlatched position, as shown in FIG. 13, of the latch assembly 14. The transition of the latch position indicator from the second indicator 70B being illuminated to the first indicator 70A being illuminated provides a visual indication to a test operator of a force being applied to the latch assembly 14 causing the unlatched position of FIG. 13.

The unlatched position illustrated in FIG. 13 is different from the unlatched position illustrated in FIG. 11. In FIG. 11, the striker 54 is not received by the latch assembly 14. In FIG. 13, the striker 54 remains engaged by the ratchet 48 of the latch assembly 14. The force exerted on the pawl 48 by the striker 54 causes rotational movement of the locking pawl 50 about the second rotational axis A2 such that the contact end 50B of the locking pawl 50 is moved out of contact with the contact 52C of the switch 52. The indicator 52B indicates an unlatched position while the striker 54 remains engaged with the ratchet 48 of the latch assembly 14.

The operating member 20 can be rotated in both the counter-clockwise and clockwise directions to determine the forces F1 and F2 required to illuminate the second indicator lights 52B of the switch to trigger an unlatched position.

A tool 71 can be connected to the base 12, as shown in FIG. 3, to facilitate unlatching the latch assembly 14 from the latched position (FIG. 12). When the latch assembly 14 is unlatched, the striker 54 disengages the ratchet 48 and the striker assembly 16 can be disconnected from the latch assembly 14. The first indicator 70A of the latch position indicator 70 indicates that the latch assembly 14 is in the unlatched position. The latch assembly 14 can be removed from the base 12 and another latch assembly can be connected to the base 12 for testing.

Another exemplary embodiment of the vehicle latch testing assembly 110 is shown in FIGS. 4-10. The features of the vehicle latch testing assembly 110 of FIGS. 4-10 that are substantially similar to the features of the vehicle latch testing assembly 10 of FIGS. 1-3 are provided the same reference numerals as the features of the vehicle latch testing assembly 10 except in the 100 series (i.e., 1xx). Moreover, the descriptions of the parts of the vehicle latch testing assembly 110 of FIGS. 4-10 that are identical to the vehicle latch testing assembly 10 of FIGS. 1-3 are omitted for the sake of brevity.

Figure 4:
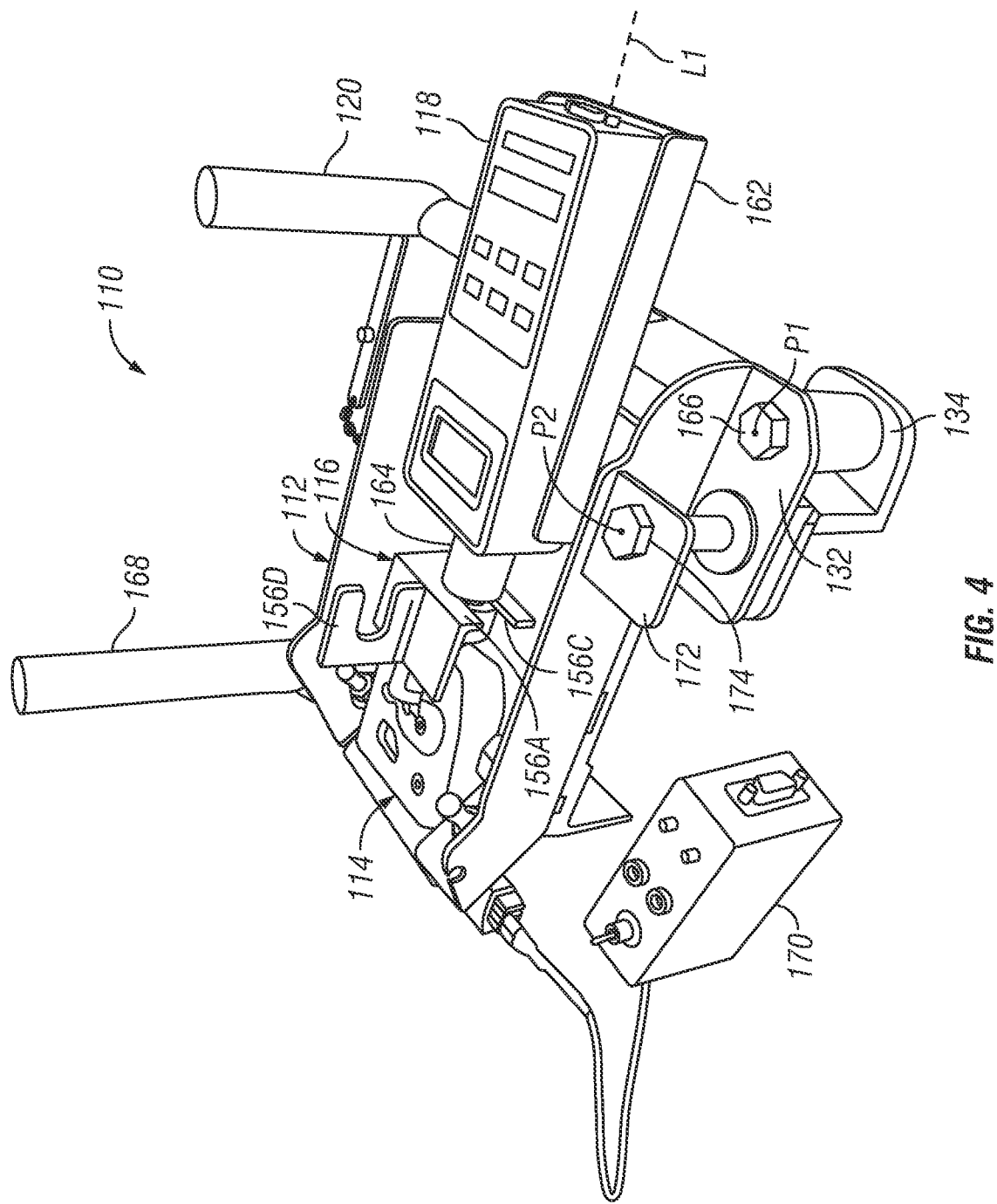
FIG. 4 is perspective view of a vehicle latch testing assembly in accordance with another exemplary embodiment in which an operating member is connected to a first pivot point and is in a first position.
Figure 5:
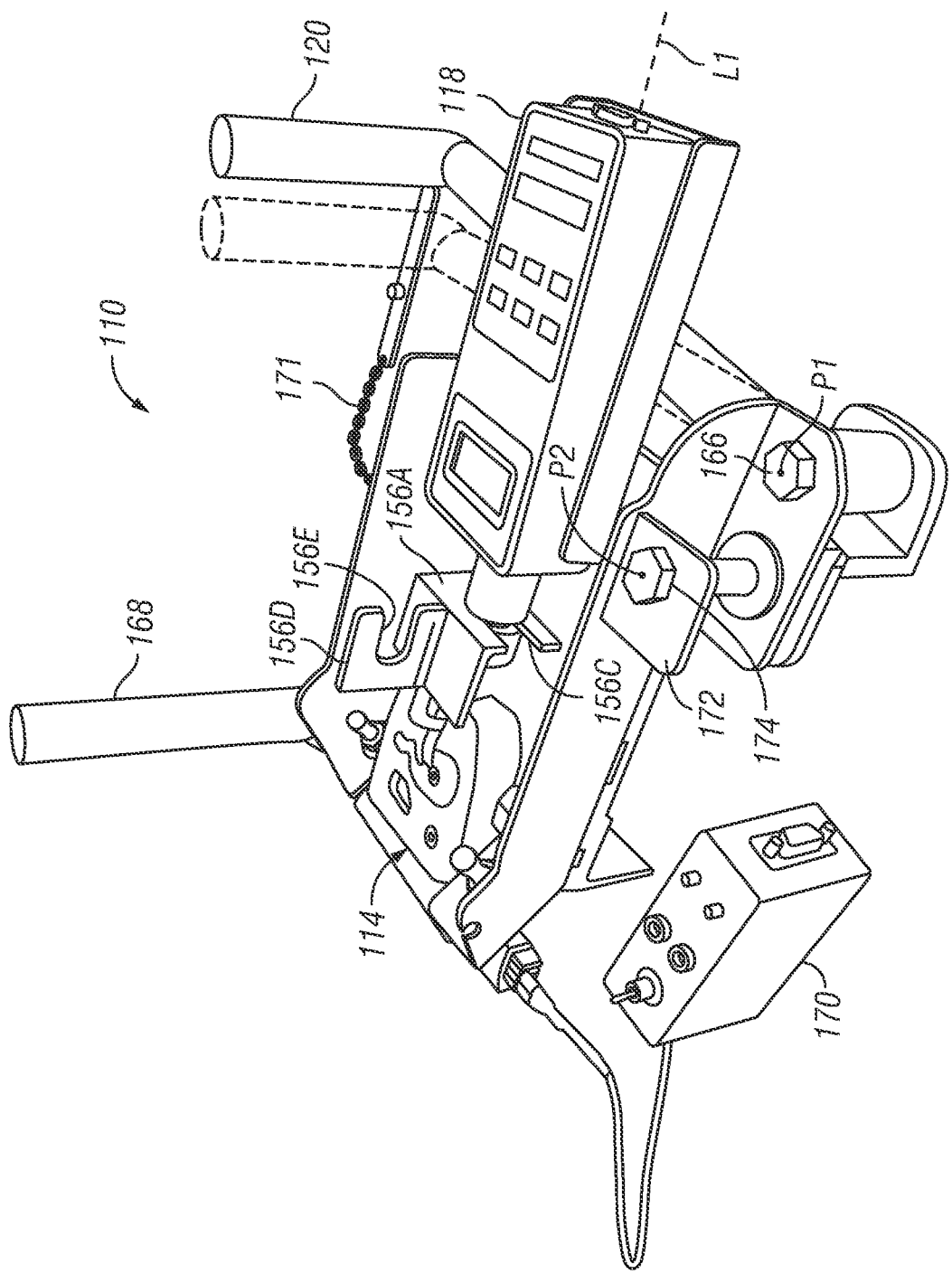
FIG. 5 is a perspective view of the vehicle latch testing assembly of FIG. 4 in which the operating member is connected to the first pivot point and is in a second position.
Figure 6:
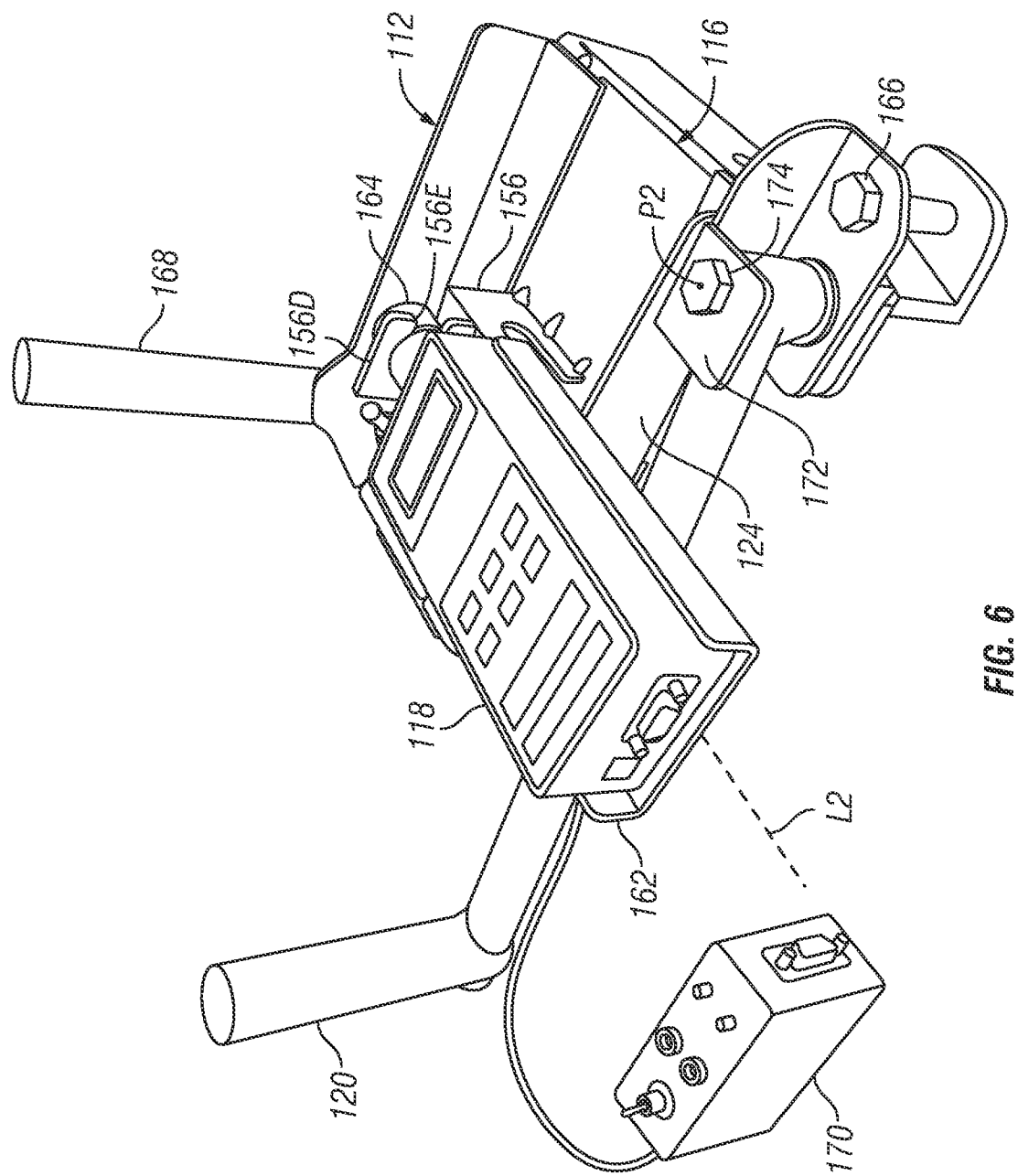
FIG. 6 is a perspective view of the vehicle latch testing assembly of FIG. 4 in which the operating member is connected to a second pivot point and is in a first position.

The base 112 includes a third receiving tab 172 extending outwardly from the first wall 124, as shown in FIGS. 4-6. The third receiving tab 172 is disposed above first and second receiving tabs 132 and 134. A fastener 174 pivotally connects the operating member 120 to the first and third receiving tabs 132 and 172. The fastener 174 defines a second pivot point P2 that is spaced from the first pivot point P1.

Figure 8:
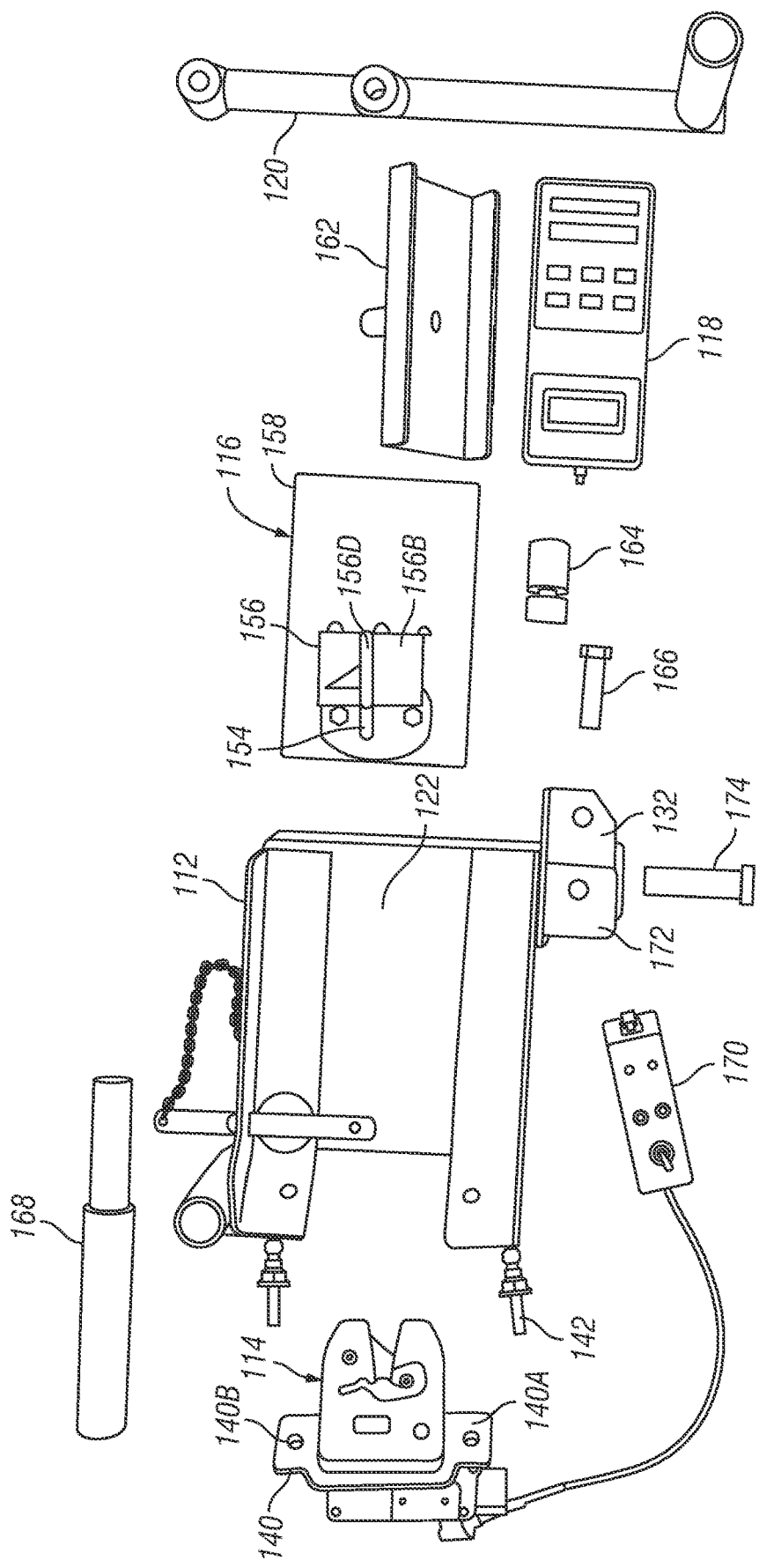
FIG. 8 is an exploded perspective view of the vehicle latch testing assembly of FIG. 4.
Figure 9:
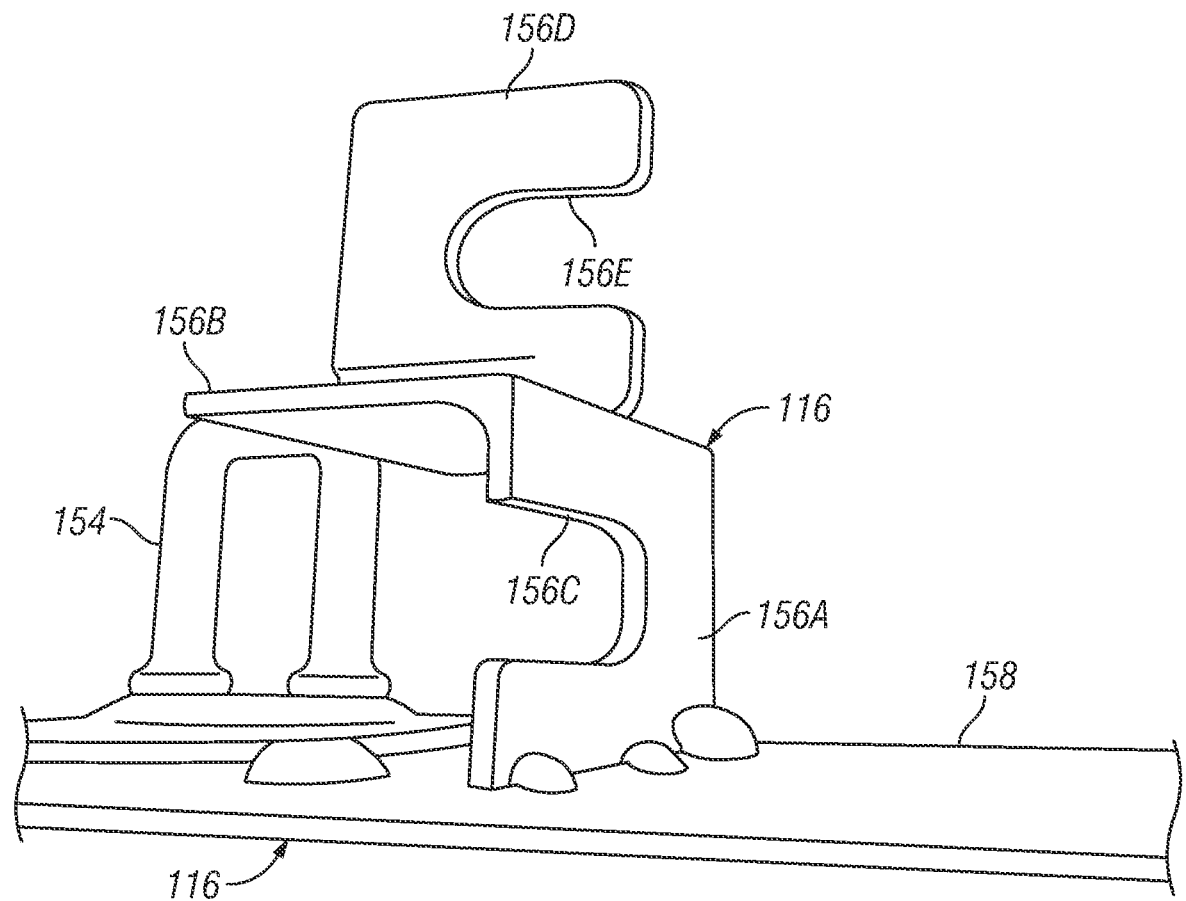
FIG. 9 is a rear perspective view of a striker assembly of the vehicle latch testing assembly of FIG. 4.
Figure 10:
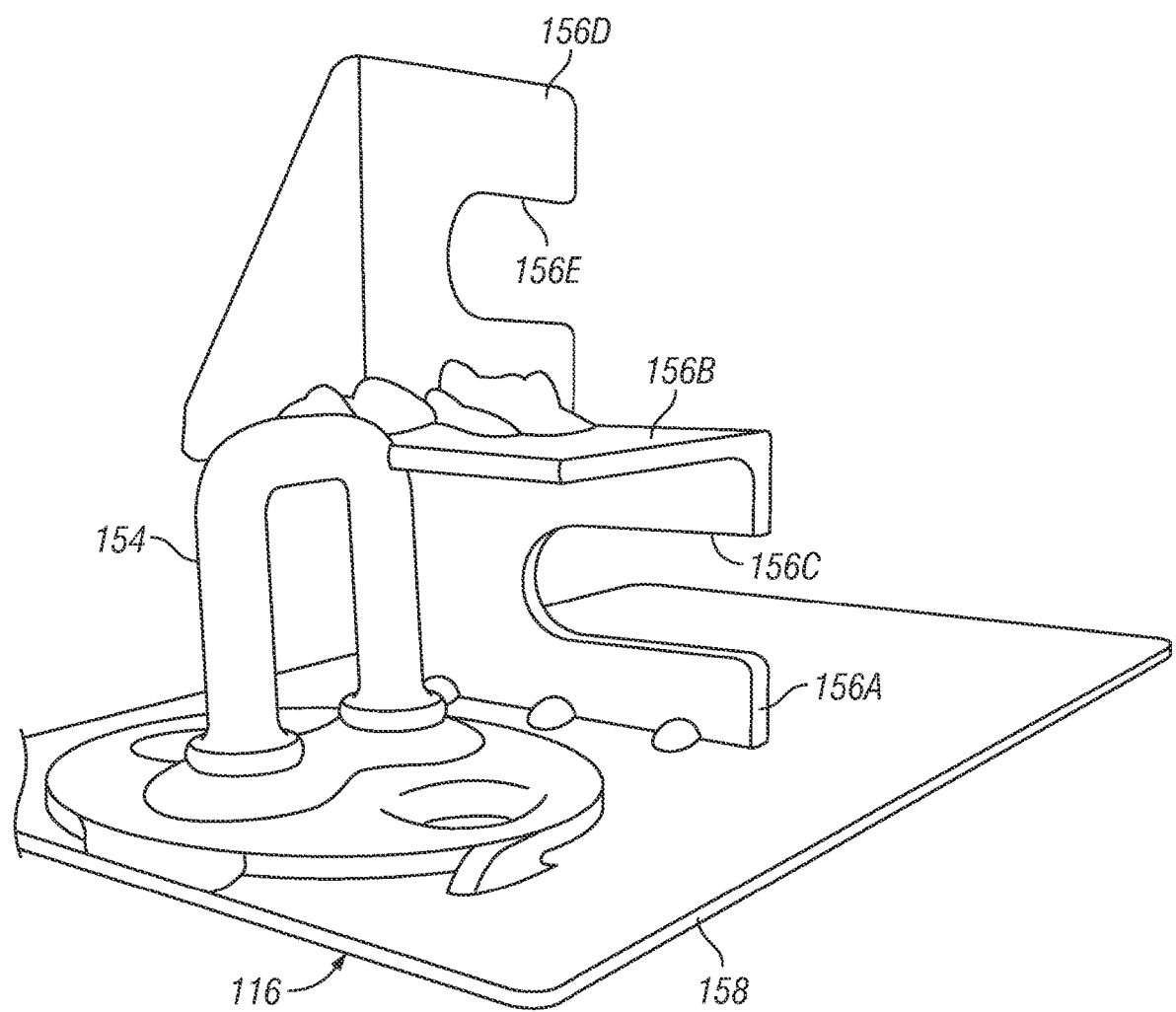
FIG. 10 is a front perspective view of the striker assembly of FIG. 9.

The support 156 of the striker assembly 116 includes a second recess 156E disposed in a third support wall 156D, as shown in FIGS. 8-10. The third support wall 156D extends substantially vertically from the second support wall 156B. The second recess 156E extends substantially perpendicularly to the first recess 156C in the first support wall 156A. The first recess 156C extends in a lateral direction of the base 158 of the striker assembly 116. The second recess 156E extends in a longitudinal direction of the base 158.

As shown in FIGS. 4 and 5, the strain gauge 118 is connected to the first support wall 156A of the striker assembly 116 such that the operating member 120 moves between a first position and a second position. The operating member 120 is configured to pivot about the first pivot point P1 to move between the first and second positions. The striker assembly 116 and the strain gauge 118 are configured to move along a first longitudinal line L1 when the operating member 120 moves between the first and second positions. The movement of the operating member 120 between the first and second positions imparts forces F1 and F2 on the ratchet 48, as shown in FIGS. 12 and 13. The strain gauge 118 is connected to the first support wall 156A, or a first side of the striker assembly 116, and the operating member 120 is connected to the first pivot point P1 of the base 112 such that the forces F1 and F2 imparted by the striker 154 on the ratchet 48 (FIGS. 12 and 13) are applied along the first longitudinal axis LL.

Figure 7:
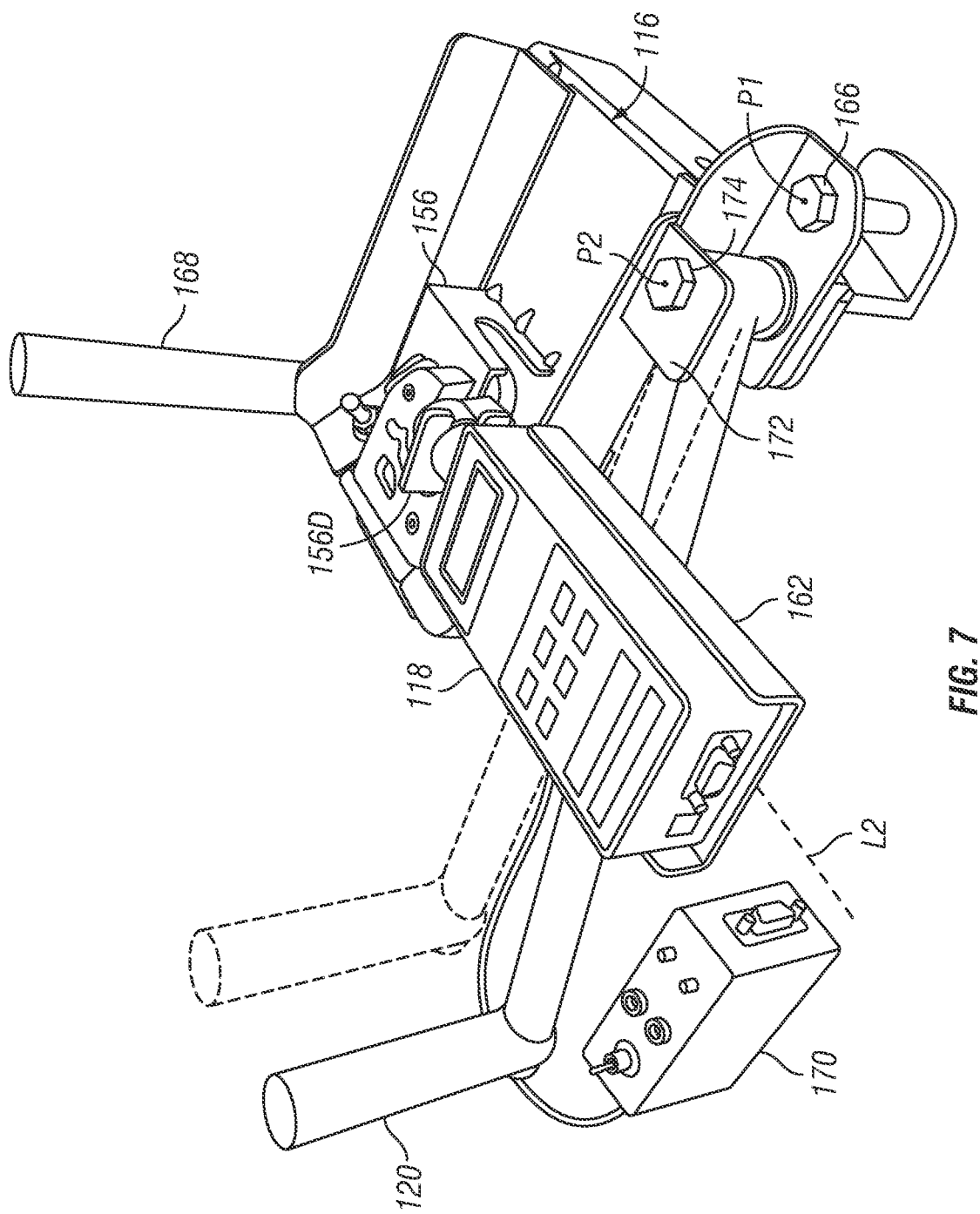
FIG. 7 is a perspective view of the vehicle latch testing assembly of FIG. 6 in which the operating member is connected to the second pivot point and is in a second position.

As shown in FIGS. 6 and 7, the strain gauge 118 is connected to the third support wall 156DA of the striker assembly 116 such that the operating member 120 moves between a third position and a fourth position. The operating member 120 is configured to pivot about the second pivot point P2 to move between the third and fourth positions. The striker assembly 116 and the strain gauge 118 are configured to move along a second longitudinal line L2 when the operating member 120 moves between the third and fourth positions. The movement of the operating member 120 between the third and fourth positions imparts forces F3 and F4 on the ratchet 48, as shown in FIGS. 12 and 13. The strain gauge 118 is connected to the third support wall 156D, or a second side of the striker assembly 116, and the operating member 120 is connected to the second pivot point P2 of the base 112 such that the forces F3 and F4 imparted by the striker 154 on the ratchet 48 (FIGS. 12 and 13) are applied along the second longitudinal axis L2. The second longitudinal axis L2 is preferably substantially perpendicular to the first longitudinal axis L1. The forces, or loads, F3 and F4 correspond to lateral, or cross-car, loads applied to the latch assembly 114.

The vehicle latch testing assembly 110, as shown in FIGS. 4-10, is configured to pivot the operating member 120 about the first pivot point P1 to apply a first force in a first direction to the latch assembly 114 and to pivot the operating member 120 about the second pivot point P2 to apply a second force in a second direction to the latch assembly 114. The first direction is along the first longitudinal axis L1. The second direction is along the second longitudinal axis L2. Preferably, the second direction is substantially perpendicular to the first direction.

Operation of the vehicle latch testing assembly 110 shown in FIGS. 4-10 is substantially similar to the vehicle latch testing assembly 10 shown in FIGS. 1-3. The operating handle 120 is connected to the first pivot point P1 of the base 112 as shown in FIGS. 4 and 5. The fastener 166 is received by the fastener openings in the first and second receiving tabs 132 and 134 and the socket of the operating member 120 to pivotally connect the operating member 120 to the base 112. The operating handle 120 is operated similarly as described above with reference to FIGS. 1-3 to impart the force along the first longitudinal axis L1 to the latch assembly 114.

To apply a force to the latch assembly 114 along the second longitudinal axis L2, as shown in FIGS. 6 and 7, the operating member 120 is disconnected from the first pivot point P1. The connecting member 164 of the strain gauge 118 is disconnected from the support member 156 of the striker assembly 116. The striker assembly 116 is not disengaged from the latch assembly 114. The latch assembly 114 remains in a latched position, as shown in FIG. 12, while the operating member 120 is disconnected from the first pivot point P1 and connected to the second pivot point P2.

The connecting member 164 of the strain gauge 118 is engaged with the second recess 156E in the third support wall 156D, as shown in FIGS. 6 and 7. The operating member 120 is connected to the second pivot point P2 by disposing the socket between the first and third receiving tabs 132 and 172. The fastener 174 is received by the socket of the operating member 120 and fastener openings in the first and third receiving tabs 132 and 172 to pivotally connect the operating member 120 to the base 112. The boss of the operating member 120 receives the protrusion of the strain gauge base 162 to pivotally connect the operating member 120 to the strain gauge 118 such that operation of the operating member 120 maintains an orientation between the striker assembly 116 and the latch assembly 114. In other words, movement of the operating member 120 about the second pivot axis P2 moves the striker assembly 116 and the strain gauge 118 substantially along the second longitudinal axis L2.

As shown in FIGS. 6 and 7, the operating member 120 is pivoted about the second pivot point P2 to apply a second force in the second direction to the latch assembly 114. Pivoting the operating member 120 in a clockwise direction imparts a force F3 on the ratchet 48 of the latch assembly as shown in FIGS. 12 and 13. Pivoting the operating member 120 in a counter-clockwise direction imparts a force F4 on the ratchet 48 of the latch assembly as shown in FIGS. 12 and 13.

Similarly to the vehicle latch testing assembly 10 of FIGS. 1-3, the vehicle latch testing assembly 110 of FIGS. 4-10 tests the latch assembly 114 connected to the base 112 to determine when a force causes the unlatched position illustrated in FIG. 13. The vehicle latch testing assembly 110 of FIGS. 4-10 allows forces F1 to F4 to be applied to the latch assembly 114 without disengaging the striker assembly 116 from the latch assembly 114. The handle 168 facilitates manipulation of the operating member 120 during testing of the latch assembly 114. The length D1 and the width W1 of the base, or plate, of the striker assembly being less than the length D2 and the width W2 of the surface 22 of the base 112, as shown in FIGS. 3 and 8, allows the striker assembly 116 to move relative to the latch assembly 114 on the surface of the base 112 such that the forces F1 to F4 can be imparted to the latch assembly 114 by the striker assembly 116 by movement of the operating member 120. The vehicle latch testing assembly 110 is configured to apply forces, or loads, in four different directions. The latch position indicator 170 indicates when the latch assembly 114 transitions from the latched position of FIG. 12 to the latched position of FIG. 13 in which an unlatched indication is indicated.

A tool 171, as shown in FIG. 5, can be connected to the base 112 and used to position the latch assembly 114 in the unlatched position such that the striker assembly 116 can be disconnected from the latch assembly 114. The latch position indicator 170 indicates the latch assembly 114 is in the unlatched position. The fasteners 142 can be removed from the fastener holes 140B in the mounting tab 140A of the latch assembly 114 and the base 112 such that the latch assembly 114 can be removed from the base 112. Another latch assembly can then be connected to the base 112 for testing.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle latch testing assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle latch testing assembly for testing vehicle door latching assemblies prior to installation within vehicles, the vehicle latch testing assembly comprising:
    a base;
    a latch assembly fixed to the base;
    a striker assembly configured to engage the latch assembly;
    a strain gauge connected to the striker assembly; and
    an operating member connected to the strain gauge and pivotally connected to the base, the operating member being configured to move between a first position and a second position to apply a first force to the latch assembly by moving the striker assembly relative to the latch assembly,
    the strain gauge being configured to determine the first force applied to the latch assembly.

2. The vehicle latch testing assembly according to claim 1, wherein
    the operating member is pivotally connected to the strain gauge such that the strain gauge moves substantially longitudinally along a longitudinal axis of the strain gauge when the operating member moves between the first and second positions.

3. The vehicle latch testing assembly according to claim 1, wherein
    the strain gauge is configured to be connected to a first side of the striker assembly and the operating member is configured to be connected to a first pivot point of the base such that the first force is applied along a first axis.

4. The vehicle latch testing assembly according to claim 3, wherein
    the strain gauge is configured to be connected to a second side of the striker assembly and the operating member is configured to be connected to a second pivot point of the base.

5. The vehicle latch testing assembly according to claim 4, wherein
    the first pivot point is spaced from the second pivot point.

6. The vehicle latch testing assembly according to claim 4, wherein
    the operating member is configured to move between a third position and a fourth position to apply a second force to the latch assembly.

7. The vehicle latch testing assembly according to claim 6, wherein
    the second force is exerted along a second axis.

8. The vehicle latch testing assembly according to claim 7, wherein
    the second axis is substantially perpendicular to the first axis.

9. The vehicle latch testing assembly according to claim 1, wherein
    a first end of the operating member is pivotally connected to the base.

10. The vehicle latch testing assembly according to claim 9, wherein a first handle is disposed at a second end of the operating member to facilitate operation of the operating member.

11. The vehicle latch testing assembly according to claim 10, wherein
a second handle is non-movably connected to the base.

12. The vehicle latch testing assembly according to claim 1, wherein
a first indicator light is electrically connected to a switch of the latch assembly, the first indicator light indicating an unlatched condition between the striker assembly and the latch assembly.

13. The vehicle latch testing assembly according to claim 12, wherein
a second indicator light is electrically connected to a switch of the latch assembly, the second indicator light indicating a latched position between the striker assembly and the latch assembly.

14. The vehicle latch testing assembly according to claim 1, wherein
the striker assembly includes a striker connected to a plate, the plate being configured to be movably disposed on a surface of the base.

15. The vehicle latch testing assembly according to claim 14, wherein
a first length of the plate is less than a second length of the surface of the base, and a first width of the plate is less than a second width of the surface of the base.

16. A method of testing a vehicle latch assembly comprising the steps of:
mounting a latch assembly to a base;
connecting a strain gauge to a striker assembly;
connecting an operating member to the strain gauge and to a first pivot point of the base;
engaging the striker assembly with the latch assembly; and
pivoting the operating member to apply a first force in a first direction to the latch assembly by moving the striker assembly relative to the latch assembly;
determining the first force with the strain gauge.

17. The method of testing the vehicle latch assembly of claim 16, further comprising
connecting the operating member to a second pivot point of the base; and
pivoting the operating member to apply a second force in a second direction to the latch assembly.

18. The vehicle latch testing assembly according to claim 17, wherein
the second direction is substantially perpendicular to the first direction.

19. The vehicle latch testing assembly according to claim 17, wherein
the operating member is disconnected from the first pivot point and is connected to the second pivot point without disengaging the striker assembly from the latch assembly.

20. The vehicle latch testing assembly according to claim 17, wherein
the operating member is pivotally connected to the strain gauge such that operation of the operating member maintains an orientation between the striker assembly and the latch assembly.

* * * * *